Sept. 4, 1934.    H. JANDER    1,972,446
REGULATING DEVICE FOR AN AUTOMATIC AUTOMOBILE CLUTCH
Filed July 1, 1930

INVENTOR
Hans Jander
BY
Symestvedt & Lechner
ATTORNEYS

Patented Sept. 4, 1934

1,972,446

UNITED STATES PATENT OFFICE 1,972,446

REGULATING DEVICE FOR AN AUTOMATIC AUTOMOBILE CLUTCH

Hans Jander, Berlin, Germany

Application July 1, 1930, Serial No. 465,097
In Germany July 5, 1929

1 Claim. (Cl. 192—.01)

This invention relates to improvements in automatic clutch operating mechanisms of the type disclosed in my copending application Serial No. 357,644.

One of the primary objects of the invention is the provision of an automatic clutch operating mechanism for automobiles which is electromagnetically operated under control of one of the usual controlling devices of the automobile, such as the foot accelerator.

Another object of the invention is the provision of an electro-magnetically controlled clutch operating mechanism in which the electro-magnetic means is so associated with the main controlling switch of the automobile that when the main switch is switched off the current to the magnetic device is also positively interrupted.

Still another object resides in the provision of an auxiliary switch in the electro-magnetic circuit.

A further object of the invention is the provision, in a device of the character described, of a manually controlled switching device connected in parallel with the switching device operated by the foot accelerator whereby the clutch may be disengaged independently of its automatic operation, the hand operated switching device being preferably associated with the change speed lever of the transmission.

A more specific object resides in the provision of vacuum operated means for operating the clutch of a motor vehicle, including controlling valve mechanism adapted to be electro-magnetically actuated under control of the foot accelerator of the motor vehicle.

How the foregoing, together with such other objects and advantages as may hereinafter appear or are incident to my invention, are realized, is illustrated in preferred form in the accompanying drawing wherein—

Figure 1:
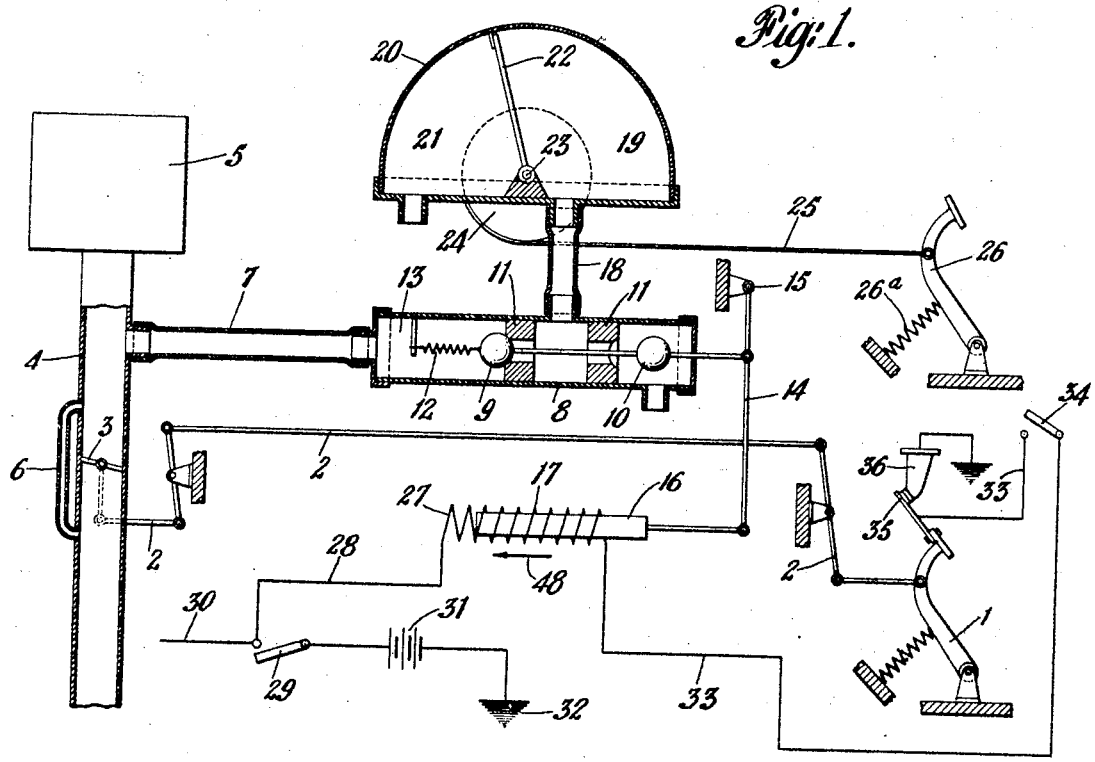
Fig. 1 is a diagrammatic view, partly in section, illustrating the application and operation of one form of the invention.

In the drawing, the usual accelerator pedal of the automobile 1 is connected by means of a rod and lever system 2 with a throttle valve 3 in the suction pipe 4 of the engine 5. The throttle valve is by-passed by a relatively small tube 6, so that a small quantity of fuel is supplied to the engine from the carburetor (not shown) even if the throttle valve is closed, the quantity of fuel being such that the engine can be started but cannot accelerate the automobile.

The fuel supply pipe 4 is connected immediately beyond the throttle valve 3 by means of a pipe 7 with a valve chamber 8. In this chamber are arranged two ball valves 9 and 10, the seats 11 of which are secured in the chamber. The valves 9 and 10 are connected together and the valve 9 is pressed to its seat by means of a compression spring 12, located between the valve and a cross arm 13. The two valves always move simultaneously either by the pressure of the spring 12 or by the pressure of a lever 14, which is pivotally supported at 15 and connected at its free end with the armature 16 of an electro-magnet 17 to be more fully described hereinafter. A pipe 18 branches from the valve chamber 8 between the valve seats 11, and opens into the vacuum chamber 19 of a casing 20, the vacuum chamber 19 being separated from a chamber 21 by a vane piston 22. The chamber 21 and the right-hand end of the valve chamber 8 are both open to the atmosphere. The vane piston 22 is secured to a shaft 23, which carries a rope pulley 24 located outside of the casing 20. To this pulley is secured a rope or chain pull 25, which is attached at its other end to the clutch pedal 26, for actuating the usual clutch of the automobile. The clutch pedal 26 is normally held in its clutch engaging position by means of a compression spring 26a.

Referring, now, to the electro-magnetic control, it will be seen that one end of the winding 27 of the electro-magnet 17 is connected by a conductor 28 to the feed cable 30 of the battery 31 at a point beyond the main controlling switch of the automobile. The negative pole of the battery is grounded at 32. The other end of the winding 27 is connected by a conductor 33 to a contact 35, which is secured to the gas pedal 1, and in the position illustrated, is connected with the stationary grounded contact pole 36. A switch 34 is provided in the conductor 33.

Referring, now, to the method of operation of the form of my invention illustrated in Fig. 1, in which figure I have shown the foot accelerator 1 in its non-depressed position, and the switches 29 and 34 in their open positions, it will be seen that the electro-magnet 17 is de-energized and that the valve 9 is in its closed position and the valve 10 in its open position, the valves being held in such positions by the action of the compression spring 12. The chamber 19 of the casing 20, therefore, is in communication with the atmosphere; and since the chamber 21 is always in communication with the atmosphere, both chambers 19 and 21 are subjected to the same pressure. The same condition would exist if only one of the switches 29 and 34 was open.

Assuming, now, that the main switch 29 as well as the switch 34 are closed, and that the foot accelerator is in its non-depressed position in which the contacts 35 and 36 are in engagement, then the electro-magnet 17 will be energized thus causing the armature 16 to move to the left. As the armature so moves, the lever 14 is moved to the left on its pivot 15, which in turn moves the valves 9 and 10 to the left, causing the valve 10 to be seated and the valve 9 to be unseated. With the valves in such position, the chamber 19 of the casing 20 is put in communication with the pipe 7. A vacuum is thus created, and the air in the pipe 7, the valve chamber 8, and the chamber 19 is drawn out. In consequence the vane piston 22 is moved to the right. This rotates the pulley 24 so that the rope 25 is wound on the pulley and the clutch pedal 26 is drawn down against the pressure of the spring 26a thus disconnecting the clutch of the automobile. Shifting of the transmission gears may then be accomplished. It is also to be noted that through the arrangement the clutch is disengaged during the starting of the engine.

When the foot accelerator 1 is depressed, the contacts 35 and 36 are separated thus causing the circuit for the electro-magnet 17 to be broken, and causing the valves 9 and 10 to move to the position shown in Fig. 1 under influence of the compression spring 12. This again equalizes the pressure in the chambers 19 and 21 and causes the clutch pedal 26 to move to its clutch engaging position under influence of the compression spring 26a.

In order to obviate waste of current when the engine is running at throttling speed for a considerable time, the auxiliary switch 34 may be opened. This enables the clutch and foot accelerator pedals to be operated independently of the automatic power device.

Figure 2:
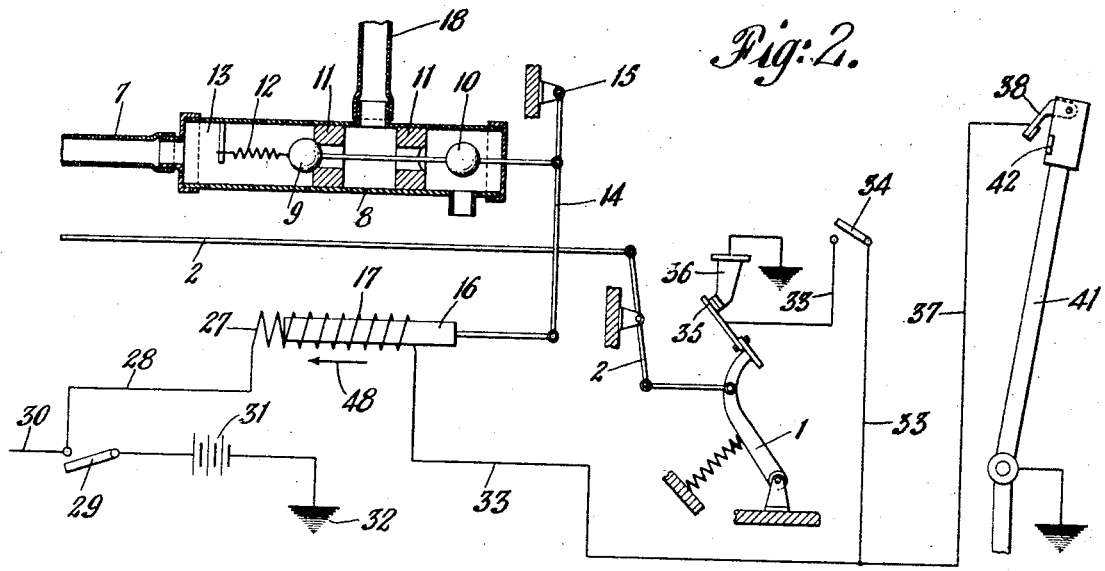
Fig. 2 is a similar view illustrating a modification of the invention.

Referring, now, to the modification illustrated in Fig. 2, it will be seen that the arrangement of the electro-magnet 17, valve mechanism 8, 9, and 10, foot accelerator 1, contacts 35 and 36, and inter-connections, is the same as that illustrated in Fig. 1. The arrangement of the clutch pedal 26 and the casing 20 and its associated parts, although not illustrated, is also the same as that illustrated in Fig. 1.

In this form, however, I have added a hand operated switching device comprising a contact arm 38 preferably pivoted on the handle of the change speed lever 41, and a contact member 42 also carried by the lever 41, the contact lever 38 being normally out of contact with the member 42. A conductor 37 is led from the conductor 33 to the contact arm 38. The contact arm 38 is suitably insulated from the lever 41 and the contact member 42 is grounded thereon. It will thus be seen that since the conductor 37 is connected to the conductor 33 the circuit for operating the electro-magnet 17 will be closed when the gear shift lever 41 is gripped for changing gears, it being noted that the contact arm 38 is so located that when the lever is gripped for shifting gears the arm is brought in contact with the contact member 42. Through this arrangement the clutch will be disengaged by means of the power device even though the foot accelerator 1 is depressed, thus enabling speed changes to be effected without interrupting the gas supply to the engine. Otherwise the device of Fig. 2 operates the same as that disclosed in Fig. 1.

What I claim is:—

In an automobile having an engine with an intake manifold, clutch pedal, gear shift lever, and throttle operating means, the combination of a power cylinder and its movable element, a connection between said cylinder and the intake manifold, an operating connection between the movable element and clutch pedal, valve means establishing communication between the intake manifold and the power cylinder in one position and movable to another position to cut off said communication and provide communication between the cylinder and the atmosphere, and an electric circuit in which is included an electro-magnet controlling the movement of said valve means, a source of electric current for the electro-magnet, switch means associated with the throttle operating means for controlling the electro-magnet and adapted to cut off the source of electric power when the throttle operating means is operated to open the throttle, and switch means associated with the gear shift lever for controlling the electro-magnet and adapted to cause a flow of electric power to the electro-magnet even when the first-mentioned switch means is in its position of cutting off the power.

HANS JANDER.